ns2,968,465
Patented Jan. 17, 1961

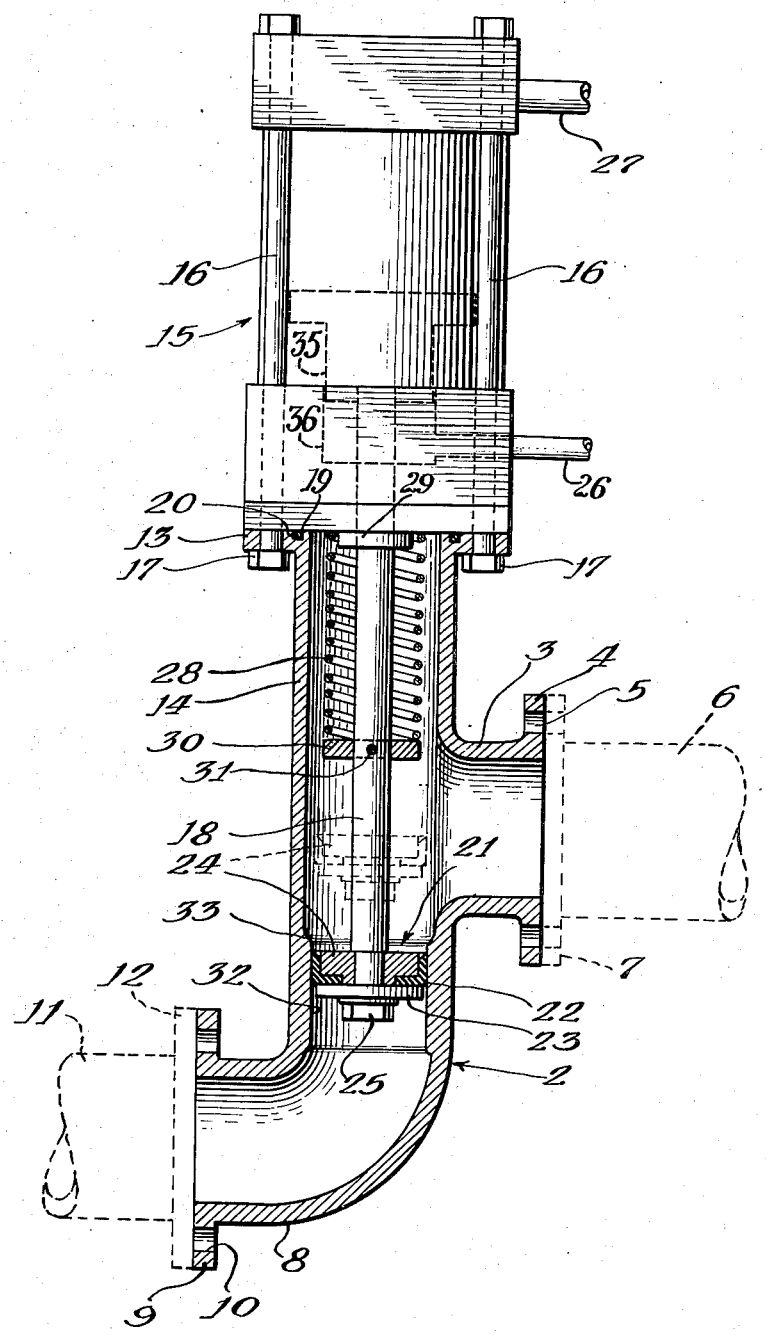

2,968,465

QUICK ACTING VALVE FOR FLUID SERVICE

Francis S. Flick, Oak Park, and Roy G. Wilkes, Chicago, Ill., assignors to Flick-Reedy Corporation, a corporation of Illinois Filed Dec. 31, 1956, Ser. No. 631,613

4 Claims. (Cl. 251—48)

This invention relates to a quick acting valve for fluid service and more particularly to a power actuated valve intended for quickly closing or opening a fluid flow line.

The primary object of this invention is to provide a new and improved quick acting valve not subject to the usual wear.

Another object is to provide a valve of the character described having means for overcoming the inertia of a valve closure without damage to the valve parts.

Another object is to provide a quick acting valve powered by a piston and cylinder device in which the inertia of movement of the valve closure is taken up by the device.

Other features, objects and advantages of the present invention will be apparent from the following description of a preferred embodiment illustrated in the accompanying drawing, in which the figure is an elevational view partly in section of a preferred form of the valve.

The valve structure of this invention is intended for use in pipe lines carrying fluids. The valve is particularly concerned with use in an instant where the flow in the line is to be quickly initiated or quickly stopped. The valve illustrated in the drawing is one for quickly closing the line against further fluid flow. The valve housing 2 is a cast member provided with an inlet member 3 having at its extremity a flange 4 provided with bolt openings 5 for connecting the housing with a pipe section 6 having a companion flange 7. The inlet is formed generally midway between the ends of the housing. An outlet 8 is cast at the lower end of the housing as shown and is similarly provided with a flange 9 having bolt openings 10 for attaching the valve to a pipe 11 having a companion flange 12. The pipes 6 and 11 are shown in slightly offset relation to accommodate the offset positioning of the flanges 4 and 9, however, other arrangements of the location of the flanges may be made as desired.

The valve housing has an upper flange 13 formed integrally with an upper cylindrical section or extension 14 of the main body. A piston and cylinder device 15, having tie rods 16 extending through its heads, is secured to the upper flange 13 by extending the rods through bolt openings in the flange to receive retaining nuts 17. The piston and cylinder device is intended for operating the valve and in this connection a piston rod 18 extends out of the lower head of the cylinder and into the valve housing 2. The head of the cylinder is sealed to the upper flange 13 by an O-ring 19 in a groove 20 in the flange, so that the fluid passing through the valve housing does not escape from the housing.

Opening and closing of the valve is accomplished and performed by a closure assembly 21. This assembly is mounted upon and carried by the piston rod 18. The assembly includes a cup seal 22 having an inwardly extending flange clamped between a pair of plates 23 and 24 so formed as to receive the seal. The assembly is held upon the lower end of the piston rod by a nut 25.

The position of the closure assembly illustrated in full lines in the drawing is such as to close the valve. A smooth cylindrical section 32 has a round inner surface against which the cup seal may slide and form a seal against passage of fluid from the inlet 3 to the outlet 8. The cup seals facing the inlet are intended to seal tightly aganist the cylindrical section 32 with higher pressure. To open the valve, the assembly is moved to the dotted line position so that fluid may flow past it to the outlet 8. The cup seals are always in balance hydraulically since the pressure on all sides of the exposed portion is the same except for the area of the rod 18 when the assembly is in its dotted line position. As the assembly is moved into the smooth cylindrical section, the cups may engage a gently rounded transition section 33 at the entrance to the cylindrical section, insuring that no damage to the seal will occur.

The operation of the valve is such that a positive return of the valve to closed position is provided. A compression spring 28 bears upwardly against the head of the piston and cylinder about rod bushing 29 and downwardly against a washer-like plate 30, secured to the piston rod by pin 31. Operating fluid admitted to the piston and cylinder device through the inlet line 26 may raise the piston assembly to its dotted line position, opening the valve. Upon release of this pressure, the spring causes a positive quick return of the assembly to the full line closing position. A similar line 27 is connected to the opposite end of the piston and cylinder device and may be used either for exhausting or for a fluid connection making a positive movement of the valve assembly in a downward direction.

An important aspect of the present invention is the elimination of solid contact of a metal valve closure on a metal seat, which in the past has caused rapid deterioration of quick acting valves. In the present valve, the closure assembly may slide a considerable distance in the cylindrical section 32 while maintaining the valve closed. The inertia of the assembly and its piston rod is taken up entirely within the piston and cylinder device by providing the usual forms of cushions and designing the cushion to obtain the desired slowing of the assembly. Usual cushion plungers 35, 36 may be provided in the cylinder cooperating with the ports in the usual way. At no time is the closure ever seated against a metal seat in such a way that an impact occurs between them. Thus the present valve may be operated continuously through many cycles without noting any wear to the valve parts and the life of the valve is thus greatly increased.

In some instances it is desirable to have the valve normally in a position so that it is closed and the spring would operate to quickly open the valve. In order to accomplish this, a mere reversal of parts may be required from that shown in the drawing. The compression spring 28 may be placed on the opposite end of the cylinder device in order to cause a quick opening of the valve, the closure being held by the fluid pressure in the cylinder in the opposite position. Such rearrangements of the parts may be made as desired.

The foregoing detailed description is given for clearness of understanding only and no unnecessary limitations are to be understood therefrom, as modifications will be obvious to those skilled in the art.

We claim:

1. A valve for fluid service comprising in combination: a valve housing having a flow passage including an elongated cylindrical section and enlarged inlet and outlet means at opposite ends of the section; a fluid pressure responsive piston and cylinder device mounted upon the housing and having a piston rod extending into said valve housing for movement into and out of said cylindrical section; means for introducing operating pressure fluid into one end of said piston and cylinder device;

cooperating means on said piston and on said cylinder for dissipating inertia of said piston and piston rod; a valve closure assembly mounted on said rod and including sealing means slidable against said cylindrical section in sealing relation therewith when said closure assembly is moved to a position within said cylindrical section; means yieldingly urging the piston rod and assembly toward said elongated section to close the valve; and said piston and cylinder device being adapted to withdraw the assembly from said section in opposition to said yielding means so that said yielding means may quickly close the valve upon release of said opposition, said cylindrical section having a length greater than that of the closure in the direction of said piston rod movement to maintain said sealing relation of the closure therewith during sliding movement of the closure in said section while said piston and cylinder device dissipate inertia of the moving parts.

2. The device of claim 1 wherein said means yieldingly urging said piston rod and assembly toward said elongated section is a spring.

3. The device of claim 1 wherein said sealing means contacts said cylindrical section in sealing relation therewith upon initial entry of the closure into said section and maintains said sealing relation during further movement of the closure within the section.

4. The device of claim 3 wherein said sealing means is a sealing ring.

References Cited in the file of this patent

UNITED STATES PATENTS

| | | |
|---|---|---|
| Re. 19,703 | Goldberg | Sept. 17, 1935 |
| 1,625,780 | Atkins | Apr. 26, 1927 |
| 1,710,635 | Wertz | Apr. 23, 1929 |
| 2,509,880 | Pelton | May 30, 1950 |
| 2,619,119 | Warcup | Nov. 25, 1952 |
| 2,621,885 | Schmitt | Dec. 16, 1952 |
| 2,632,631 | Griffin | Mar. 24, 1953 |
| 2,646,074 | Hopkins | July 21, 1953 |
| 2,778,598 | Bolling | Jan. 22, 1957 |

FOREIGN PATENTS

| | | |
|---|---|---|
| 8,372 | Great Britain | of 1914 |
| 128,898 | Australia | Aug. 26, 1948 |